United States Patent

Hayakawa et al.

Patent Number: 5,156,438
Date of Patent: Oct. 20, 1992

[54] AUTOMOTIVE SEAT ASSEMBLY WITH SAFETY MECHANISM

[75] Inventors: Hatsuo Hayakawa; Mikio Honma; Hidemasa Hirakui, all of Yokohama; Hideki Irie; Mikio Fujiwara, both of Kanagawa Prefecture, all of Japan

[73] Assignees: Ikeda Bussan Co., Ltd., Ayase; Ohi Seisakusho Co., Ltd., Yokohama, both of Japan

[21] Appl. No.: 652,061

[22] Filed: Feb. 7, 1991

[30] Foreign Application Priority Data

Feb. 9, 1990 [JP] Japan .................... 2-28260
Feb. 9, 1990 [JP] Japan .................... 2-28261

[51] Int. Cl.⁵ .................................... A47C 1/02
[52] U.S. Cl. ............................... 297/335; 297/344
[58] Field of Search ............ 297/335, 336, 337, 344, 297/379, 378, 317, 324, 325, 326, 63, 64, 65; 248/429, 430, 428

[56] References Cited

U.S. PATENT DOCUMENTS

| | | | |
|---|---|---|---|
| 4,268,086 | 5/1981 | Okuyama | 297/321 X |
| 4,395,011 | 7/1983 | Torta | 297/335 X |
| 4,402,120 | 11/1984 | Fudala | 297/325 X |
| 4,541,667 | 9/1985 | Ebihara et al. | 297/64 |
| 4,616,875 | 10/1986 | McFalls et al. | 297/325 |
| 4,627,656 | 12/1986 | Gokimoto et al. | 297/336 X |
| 4,695,094 | 9/1987 | Siebler | 297/336 X |
| 4,781,354 | 11/1988 | Nihet et al. | 297/379 X |
| 4,936,535 | 6/1990 | Johansson | 240/430 |

Primary Examiner—Jose V. Chen
Attorney, Agent, or Firm—Foley & Lardner

[57] ABSTRACT

A seat assembly for a motor vehicle is shown. The assembly comprises a lower rail secured to a floor of the vehicle; an upper rail slidably engaged with the lower rail; a base structure secured to the upper rail to move therewith; a seat cushion held by the base structure in a manner to pivot between a horizontal operative position and an upright inoperative position; a seat slide latching mechanism for latching the upper rail to the lower rail; a seat cushion latching mechanism for latching the seat cushion at both the horizontal operative and upright inoperative postions relative to the base structure; a latch cancelling mechanism incorporated with the seat cushion latching mechanism for cancelling the latched condition of the seat cushion when actuated; and a restraining mechanism incorporated with the latch cancelling mechanism. The restraining mechanism latches the upper rail to the lower rail when the latch cancelling mechanism is being actuated.

6 Claims, 12 Drawing Sheets

AUTOMOTIVE SEAT ASSEMBLY WITH SAFETY MECHANISM

BACKGROUND OF THE INVENTION

1. Field of the Invention

The present invention relates to seats for commercial cars, such as van-type motor vehicles, and more particularly, to seat assemblies of a type which is equipped with both a seat slide mechanism by which the seat proper can slide between front and rear given latched positions and a seat cushion folding mechanism by which the seat cushion can pivot between horizontal and upright latched positions. More specifically, the present invention is concerned with a safety mechanism employed in such seat assemblies.

2. Description of the Prior Art

In van-type motor vehicles or the like, slidable and foldable seats are widely used as a rear seat. In fact, when the associated vehicle is intended to be used as a luggage carrying car, the seat cushion is folded up and the seat assembly is slid forward to a front latched position. With this, a luggage carrying space defined at a rear space of the vehicle cabin is increased. When the vehicle is intended to be used just as a passenger car, the seat assembly is moved back to a rear latched position and the seat cushion is pivoted down to its horizontal operative position.

One of the conventional seat assemblies of such type comprises generally two lower rails secured to a vehicle floor, two upper rails slidably engaged with the lower rails and having mounted thereon a seat proper, a seat cushion latching mechanism for latching the seat cushion at both the horizontal and folded-up positions, a seat slide latching mechanism for achieving a latched engagement between the upper and lower rails at front and rear given positions and a latch cancelling mechanism for cancelling the latched engagement between the upper and lower rails.

However, due to its inherent construction, the seat assembly of this type has the following drawback.

That is, when the latch cancelling mechanism is incidentally touched or actuated by a person who is manipulating the seat cushion latching mechanism for changing the angular position of the seat cushion, unexpected sliding of the seat assembly tends to occur. This is dangerous or at least uncomfortable.

SUMMARY OF THE INVENTION

It is therefore an object of the present invention to provide a seat assembly which is free of the above-mentioned drawback.

According to the present invention, there is provided a seat assembly for a motor vehicle. The seat assembly comprises a lower rail secured to a floor of the vehicle; an upper rail slidably engaged with the lower rail; a base structure secured to the upper rail to move therewith; a seat cushion held by the base structure in a manner to pivot between a horizontal operative position and an upright inoperative position; a seat slide latching mechanism for latching the upper rail to the lower rail; a seat cushion latching mechanism for latching the seat cushion at both the horizontal operative and upright inoperative positions relative to the base structure; a latch cancelling mechanism incorporated with the seat cushion latching mechanism for cancelling the latched condition of the seat cushion when actuated; and a restraining mechanism incorporated with the latch cancelling mechanism, the restraining mechanism latching the upper rail to the lower rail when the latch cancelling mechanism is being actuated.

BRIEF DESCRIPTION OF THE DRAWINGS

Other objects and advantages of the present invention will become apparent from the following description when taken in conjunction with the accompanying drawings in which.

DETAILED DESCRIPTION OF THE INVENTION

Figure 1:
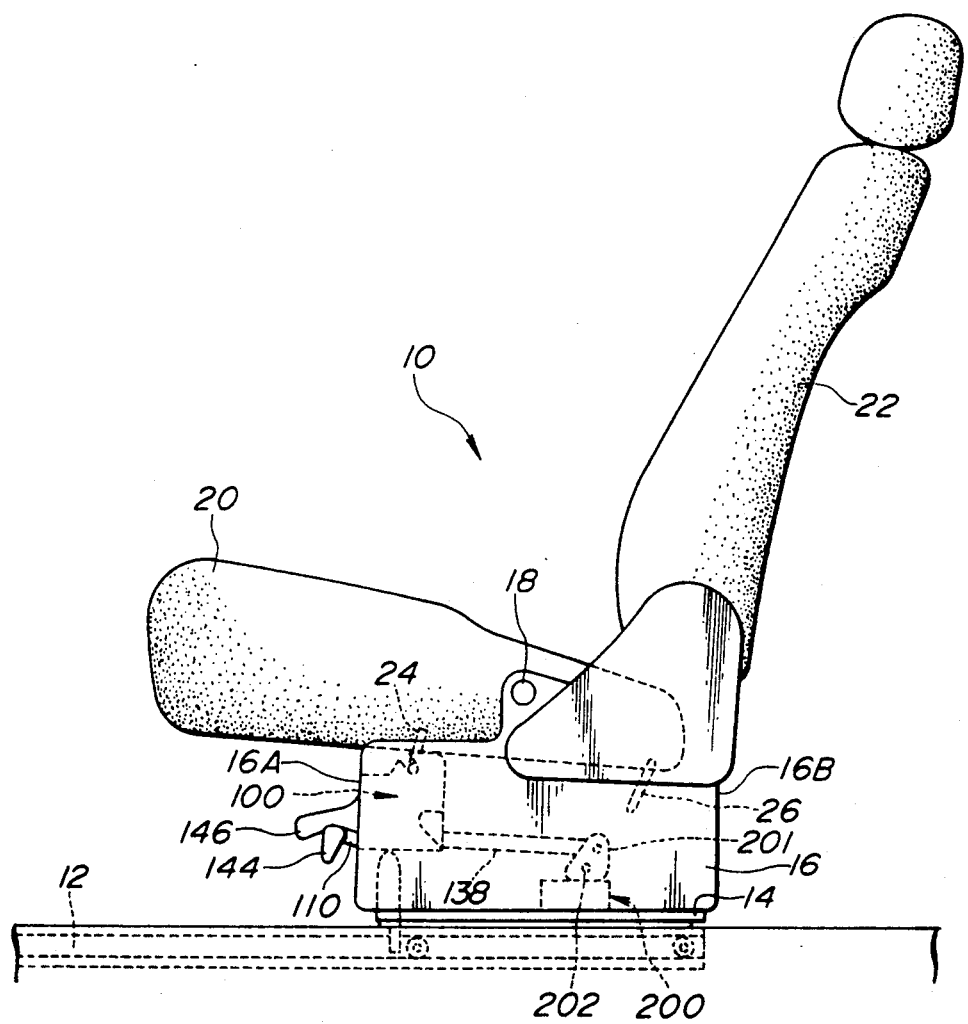
FIG. 1 is view of a seat assembly of the present invention, showing a condition wherein the seat assembly assumes a rear latched position and a seat cushion thereof assumes a horizontal latched position.
Figure 2:
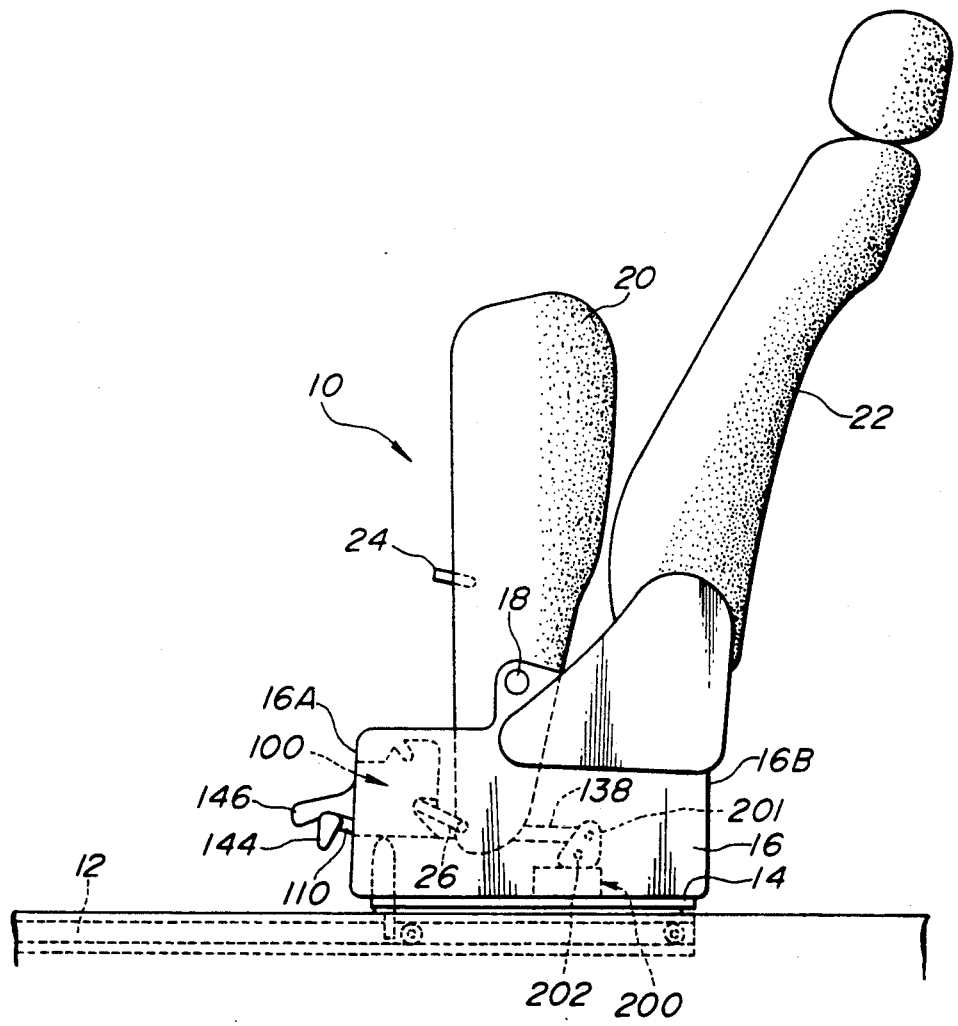
FIG. 2 is a view similar to FIG. 2, but showing a condition wherein the seat cushion assumes a folded-up latched position.

Referring to FIGS. 1 and 2 of the accompanying drawings, there is shown an automotive seat assembly 10 according to the present invention.

The seat assembly 10 generally comprises two lower rails 12 which are secured to a vehicle floor, two upper rails 14 which are slidably engaged with the fixed lower rails 12, two supporting members 16 which are respectively mounted on the upper rails 14, a seat cushion 20 which is pivotally held by the supporting members 16 by means of a pivot shaft 18, so that the seat cushion 20 can take a horizontal operative (viz., seat occupant holding) position as shown in FIG. 1 and a folded-up position as shown in FIG. 2, and a seatback 22 which is mounted to the supporting members 16 through a known reclining mechanism, so that the inclination angle of the seatback 22 relative to the seat cushion 20 is adjustable.

As will become apparent as the description proceeds, the forward movement of the seat assembly 10 is carried out with the seat cushion 20 kept folded up as shown in FIG. 2. When thus the seat assembly 10 assumes a front position, a larger luggage space is defined behind the seat assembly 10 in the vehicle cabin.

The seat cushion 20 has at its lower surface a first striker 24 secured thereto and at its rear lower surface a second striker 26 secured thereto. Each striker 24 or 26 is generally U-shaped having the hook portions secured to the lower surface of the seat cushion 20. Reinforcing members are used for assuring the connection of the strikers 24 and 26 to the seat cushion 20.

Figure 3:
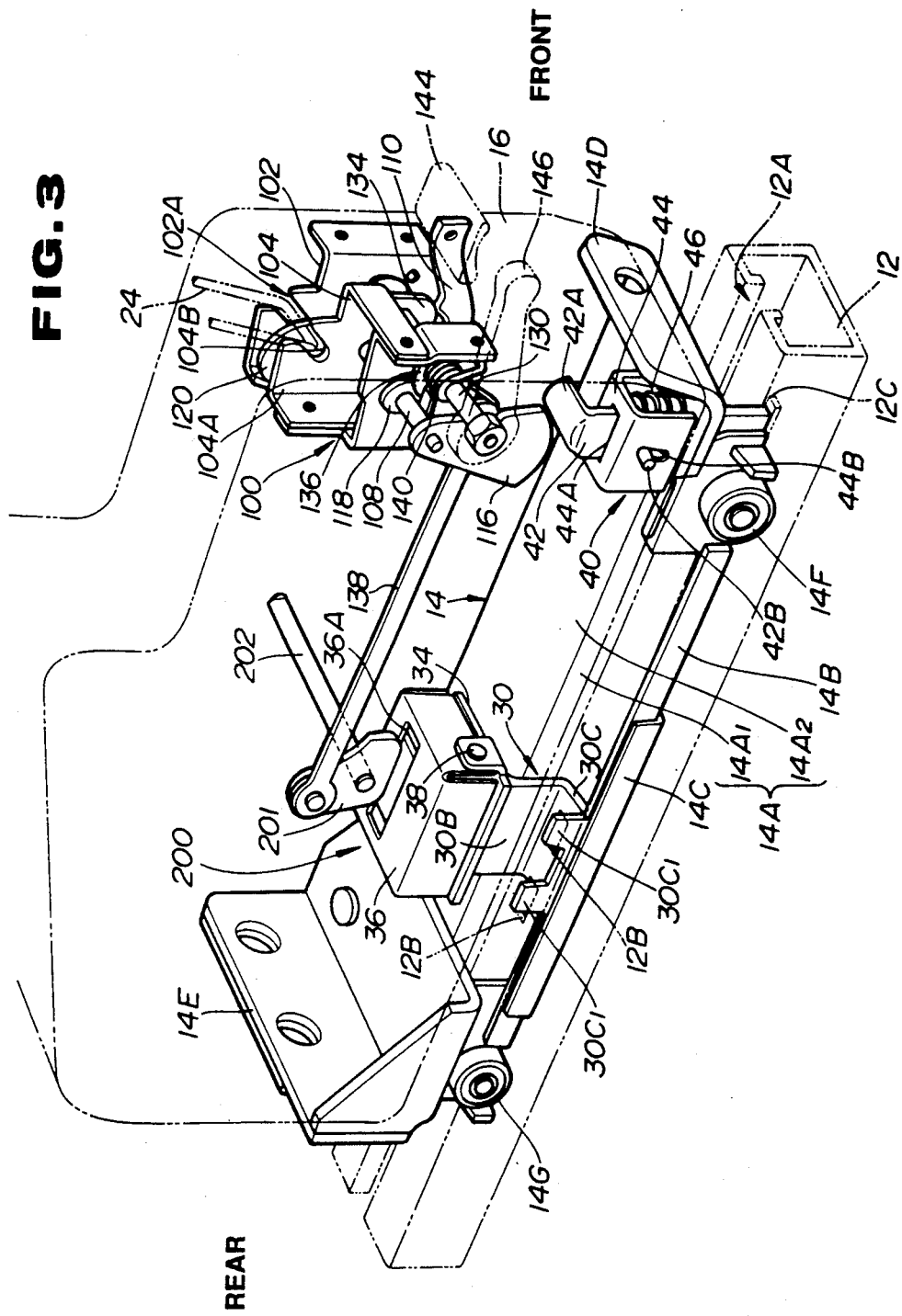
FIG. 3 is a perspective view of an essential portion of the seat assembly.

As is seen from FIG. 3, the supporting member 16 illustrated in this drawing is a member which is placed at a right side of the seat assembly 10 with respect to a seat occupant sitting on the seat proper 20. The supportig member 16 is mounted on an upper flat surface of the upper rail 14.

Figure 4:
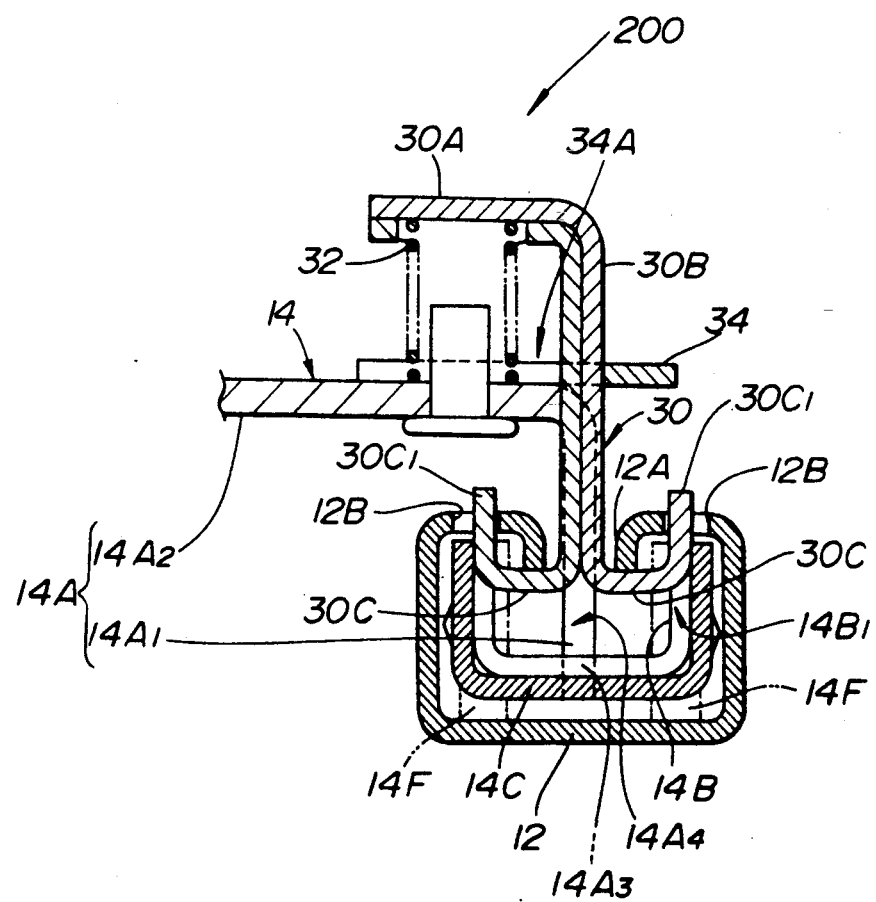
FIG. 4 is a sectional view of a seat slide latching mechanism employed in the seat assembly.

As is understood from FIG. 4, the upper rail 14 comprises an upper rail major portion 14A of generally L-shaped cross section which includes a vertical part 14A1 and a horizontal part 14A2, a longer inside reinforcing member 14B of generally C-shaped cross section which is welded along its center axis to the lower end of the vertical part 14A1 having the open side thereof directed upward, and a shorter outside reinforcing member 14C of generally C-shaped cross section which is welded along its center axis to both the lower end of the vertical part 14A1 and the inside reinforcing member 14B having the open side thereof directed upward. For assuring the connection of each reinforcing member 14B or 14C with the major portion 14A, the lower end of the vertical part 14A1 is formed with a plurality of projections 14A3 each being received in corresponding aligned bores (no numerals) formed in the intimately overlapped parts of the inside and outside reinforcing members 14B and 14C.

As is seen from FIG. 3, two mounting brackets 14D and 14E are secured to front and rear ends of the horizontal part 14A2 of the upper rail 14 for tightly supporting thereon the supporting member 16.

As is understood from FIGS. 3 and 4, the lower rail 12 has a generally C-shaped cross section and is arranged in a manner to have the axially extending slit 12A thereof directed upward. The overlapped inside and outside reinforcing members 14B and 14C of the upper rail 14 are slidably received in the lower rail 12 having the vertical part 14A1 projected upward through the slit 12A.

The entire of the lower rail 12 is accommodated in a groove formed in the vehicle floor as is seen from FIGS. 1 and 2.

As is understood from FIGS. 3 and 4, the upper horizontal wall of the lower rail 12 is formed at its front and rear portions with front and rear groups of lock openings 12B, each group including two pairs of openings 12B.

In the disclosed embodiment, the vertical part 14A1 of the upper rail 14 is provided at its front and rear ends with paired rollers 14F and 14G respectively, which rollers run on a flat bottom surface of the lower rail 12 to allow a smooth movement of the upper rail 14 relative to the lower rail 12.

Referring to FIGS. 3 and 4, designated by numeral 200 is a seat slide latching mechanism. The mechanism 200 comprises a latch member 30 which is vertically movably held by the upper rail 14 for the purpose of latching and unlatching the upper rail 14 relative to the lower rail 12.

As is seen from FIG. 4, the latch member 30 includes a horizontal portion 30A, a vertical portion 30B extending downward from one side of the horizontal portion 30A and paired hook portions 30C provided at a lower part of the vertical portion 30B. The hook portions 30C are attached to each other in a back-to-back fashion.

The paired hook portions 30C are vertically movably received within the shorter outside reinforcing member 14C of the upper rail 14. For this, the vertical part 14A1 of the upper rail 14 is formed with an aperture 14A4 to vertically slidably receive therein the vertical portion 30B of the latch member 30, and the longer inside reinforcing member 14B is formed at its side walls with aligned cuts 14B1 to receive therein the hook portions 30C of the latch member 30.

Each hook portion 30C is formed with two upwardly projected latch pawls 30C1 which are latchingly engageable with corresponding two of the lock openings 12B of the lower rail 12. Between the horizontal portion 30A of the latch member 30 and the horizontal part 14A2 of the upper rail 14, there is compressed a coil spring 32 for biasing the latch member upward, that is, in a direction to achieve a latched engagement of the latch pawls 30C1 with the lock openings 12B of the lower rail 12.

As is described hereinafore, the arrangement of the latch member 30 is so made that the vertical portion 30B is vertically movably received in the aperture 14A4 of the vertical portion 14A1 of the upper rail 14 and the hook portions 30C are vertically movably received in the aligned cuts 14B1 of the longer inside reinforcing member 14B.

The horizontal portion 14A2 of the upper rail 14 has a base plate 34 secured thereto. The base plate 34 is formed with a cut 34A through which the vertical portion 30B of the latch member 30 passes. As is seen from FIG. 3, a rectangular housing 36 is mounted on and secured to the base plate 34 by means of screws 38 to house the upper portion of the latch member 30. The housing 36 is formed with an elongate aperture 36A through which the horizontal portion 30A of the latch member 30 is partially exposed.

Usually, due to the biasing force of the coil spring 32, the latch member 30 is biased upward relative to the upper rail 14. However, when the latch member 30 is applied with a considerable downward force, the same moves downward against the biasing force of the spring 32, that is, in a direction to disengage the latch pawls 30C1 from the lock openings 12B of the lower rail 12.

As is seen from FIG. 3, a so-called "restraining mechanism" 40 is mounted to the front mounting bracket 14D on the upper rail 14, which is incorporated with an after-mentioned seat cushion latching mechanism 100 and functions to latch the upper rail 14 to the lower rail 12 at a given position of the upper rail 14.

The restraining mechanism 40 comprises a vertically movable actuating lever 42 which has a bent upper portion 42A. The bent upper portion 42A has a convex outer surface as shown in FIG. 3. A guide pin 42B is fixed to a middle part of the actuating lever 42 to move therewith. The actuating lever 42 has a lower portion projected into the lower rail 12 through aligned apertures (not shown) formed in the mounting bracket 14D and the horizontal portion 14A2 of the upper rail 14. A generally U-shaped bracket 44 is secured to the front mounting bracket 14D for guiding the movement of the actuating lever 42. For this guiding, the bracket 44 has at its upper bridge part an elongate slot 44A through which the upper portion of the actuating lever 42 projects outward and at one side wall part a vertically extending guide slot 44B through which the guide pin 42B projects outward. A compression spring 46 is installed in the bracket 44 to bias the actuating lever 42 upward, that is, in a direction to achieve an abutment of the guide pin 42B with an upper end of the guide slot 44B.

When, with the upper rail 14 assuming a given latched position relative to the lower rail 12, the actuating lever 42 is pressed down, the lower end of the same is inserted into a locking opening 12C formed in a given part of the base portion of the lower rail 12.

Referring to FIGS. 3. 5 and 7, the seat cushion latching mechanism 100 is shown, which has a base structure secured to a front wall 16A of the supporting member 16.

Figure 5:
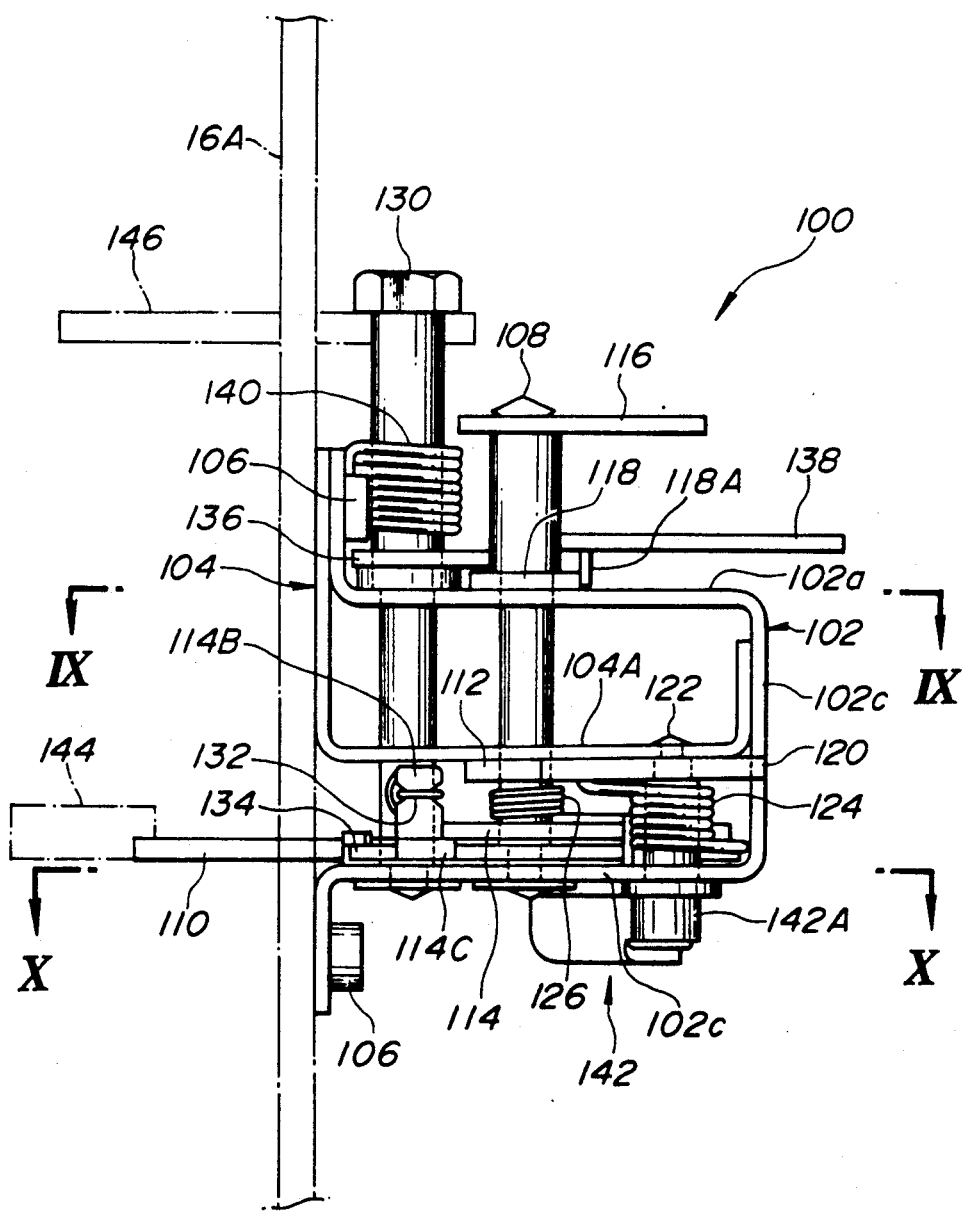
FIG. 5 is a plan view of a seat cushion latching mechanism employed in the seat assembly.

As is best seen from FIG. 5, the base structure includes a first base plate 102 and a second base plate 104. The first base plate 102 is generally U-shaped having opposesd side walls 102a and 102b connected through a base wall 102c. The second base plate 104 is generally L-shaped and secured to the first base plate 102 in a manner to form an intermediate wall 104A between the opposed side walls 102a and 102b. The base structure (102+104) has a plurality of welded nuts 106 with which bolts (not shown) are incorporated to secure the base structure (102+104) to the front wall 16A of the supporting member 16.

Designated by numeral 108 is a first pivot shaft which is rotatably supported by the base structure (102+104). More specifically, the first pivot shaft 108 passes through three aligned openings which are formed in the opposed side walls 102a and 102b of the first base plate 102 and the intermediate wall 104A of the second base plate 104.

An operation lever 110 is seucred to the first pivot shaft 108 to pivot therewith. The operation lever 110 has a front portion which is exposed to the front of the front wall 16A. A first control handle 144 is secured to the exposed front end of the operation lever 110.

As will be described in detail hereinafter, a latching plate 112 and a latch condition detecting lever 114 are pivotally connected to the first pivot shaft 108, and a cam plate 116 and a pawl member 118 are secured to the first pivot shaft 108 to pivot therewith.

Designated by numeral 120 is a first latch member which can be latched by the above-mentioned latching plate 112. The first latch member 120 is pivotally disposed about a shaft 122 which is secured to the side wall 102b and the intermediate wall 104A of the base structure (102+104) spanning the same. A coil spring 124 is disposed about the shaft 122 to bias the first latch member 120 in a clockwise direction in FIG. 3, that is, in a clockwise direction in FIG. 7.

Figure 7:
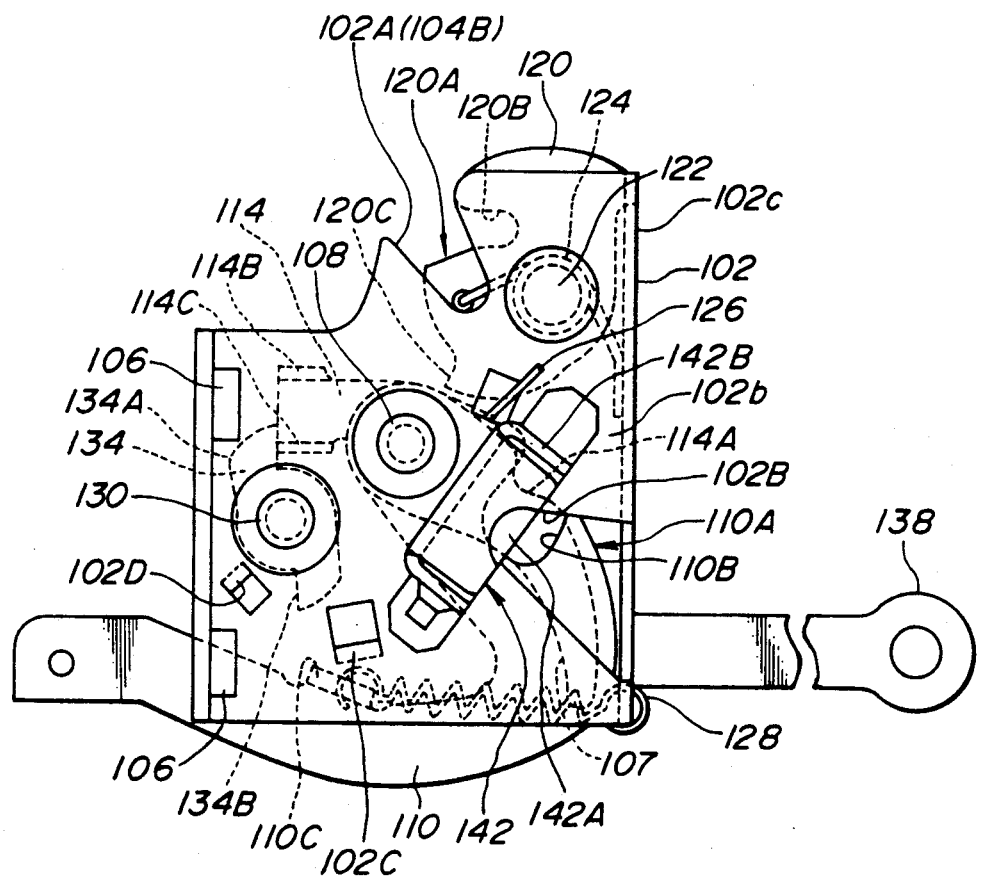
FIG. 7 is a left-side view of the seat cushion latching mechanism with a locking plate removed for clarification of the drawing.

As is understood from FIGS. 3 and 7, the side wall 102b and the intermediate wall 104A of the base structure (102+104) have at their upper portions respective recesses 102A and 104B which are so aligned and sized as to receive the above-mentioned first striker 24.

The first latch member 120 is formed with a striker catching recess 120B by which the first striker 24 can be caught. The catching recess 120B has a lower peripheral side 120A against which the first striker 24 is collidable. Furthermore, the first latch member 120 is formed with a stepped portion 120C with which an end of the latching plate 112 is latchingly engageable.

Figure 10:
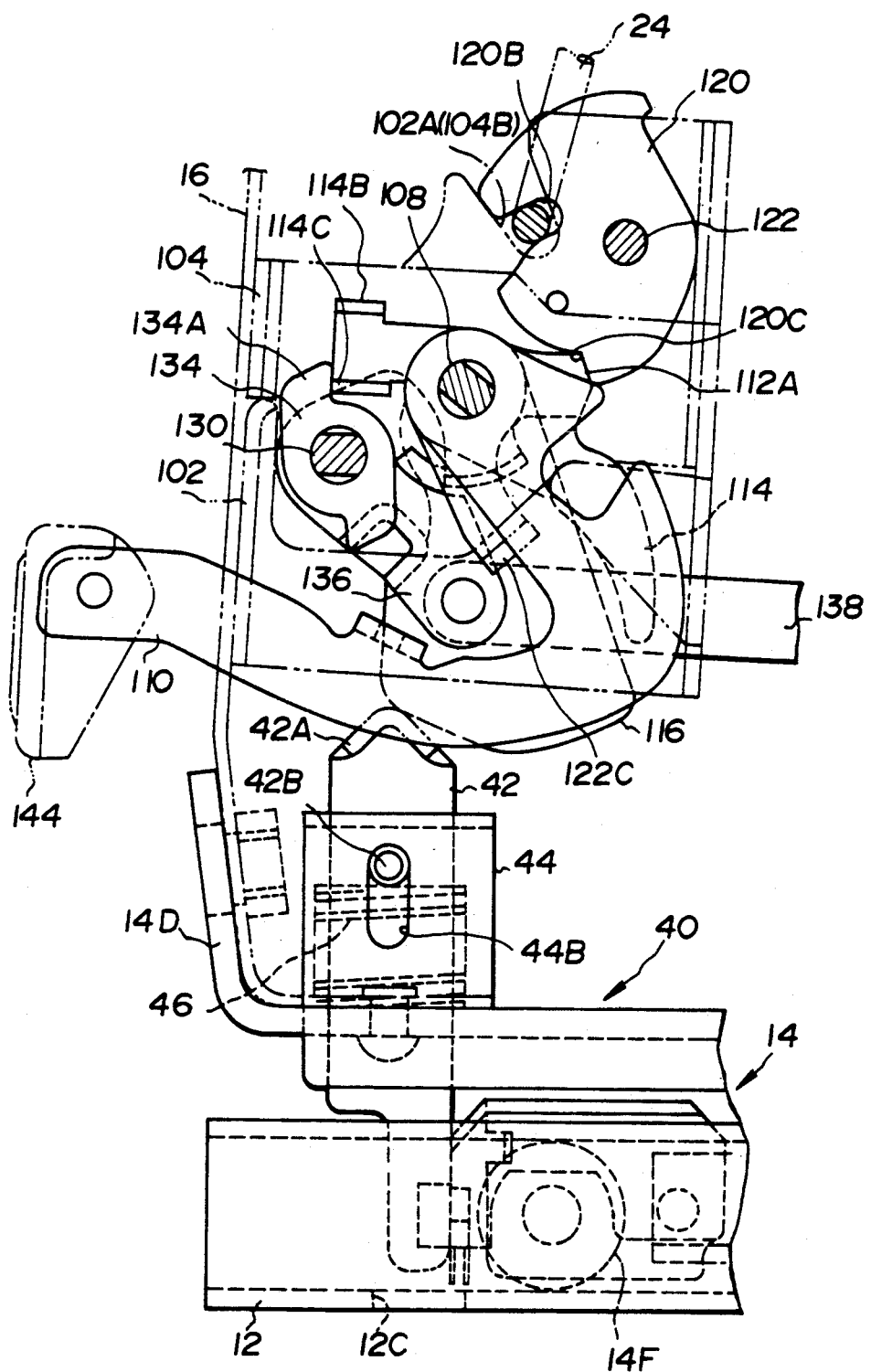
FIG. 10 is a sectional view taken along the line X—X of FIG. 5, with a sensor mechanism incorporated with the seat cushion latching mechanism.
Figure 11:
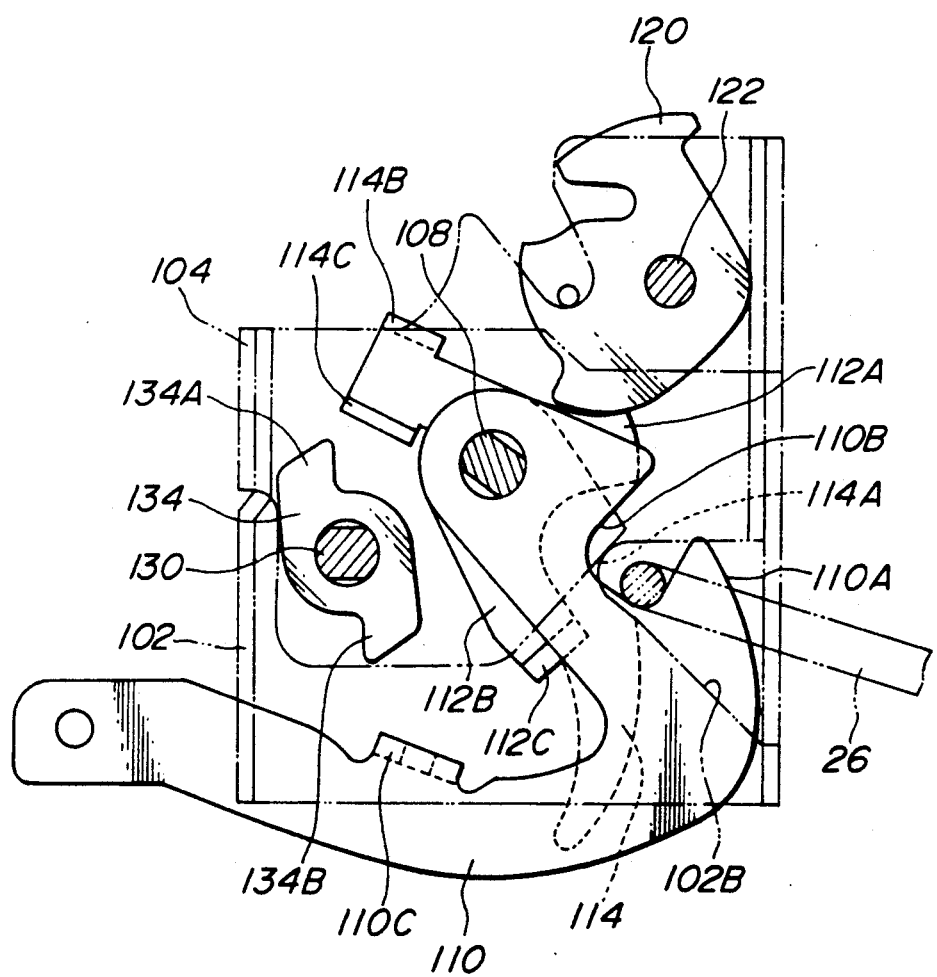
FIG. 11 is a view similar to FIG. 10, but showing a different condition of the seat cushion latching mechanism.

As is seen from FIGS. 10 and 11, the latching plate 112 is generally L-shaped and has a first leg portion 112A whose leading end is latchingly engageable with the stepped portion 120C of the first latch member 120, and a second leg portion 112B whose leading end has a bent portion 112C. The latching plate 112 is biased in a counterclockwise direction in FIG. 10 by a coil spring 126 (see FIG. 5) disposed about the first pivot shaft 108. Due to the force of the coil spring 126, the bent portion 112C of the latching plate 112 is forced to abut against the operation lever 110 to bias the same in the counterclockwise direction in FIG. 10.

The operation lever 110 can serve as a second latch member by which the afore-mentioned second striker 26 can be caught. For this, the operation lever 110 is shaped like the letter "J" and secured at its base portion to the first pivot shaft 108, as has been described hereinafore.

The operation lever 110 is formed near the base portion with a striker catching recess 110B by which the second striker 26 can be caught. The catching recess 110B has a lower shoulder portion 110A against which the second striker 26 is collidable. The operation lever 110 further has at a portion remote from the base portion a bent portion 110C.

As is seen from FIG. 7, a spring 128 extends between the base wall 102c of the base structure (102+104) and the bent portion 110C of the operation lever 110, so that the operation lever 110 is biased in a counterclockwise direction in this drawing to abut against a portion of the base structure (102+104).

As is understood from FIG. 7, the side wall 102b and the base wall 102c of the base structure (102+104) are partially cut away to form an opening or recess 102B which is sized to accommodate the second striker 26.

The side wall 102b of the base structure (102+104) is integrally formed with a raised stopper piece to which the operation lever 110 is contactable thereby to restrict the upward pivoting of the operation lever 110 to certain degree.

As is understood from FIG. 7, the latch condition detecting lever 114 is generally J-shaped, whose leading end portion is located near the recess 102B. The detecting lever 114 is formed at its middle portion with a recess 114A with which the second striker 26 is engageable. The detecting lever 114 is further formed at its head portion with first and second bent portions 114B and 114C which face each other.

As is seen from FIG. 5, the first bent portion 114B of the detecting lever 114 holds one end of a spring 132 whose other end is hooked to a second pivot shaft 130 which will be described hereinafter. With the spring 132, the latch condition detecting lever 114 is biased to pivot about the first pivot shaft 108 in a counterclockwise direction in FIG. 7.

As is seen from FIG. 5, the second pivot shaft 130 extends in parallel with the first pivot shaft 108 and is pivotally supported by the side walls 102a and 102b and the intermediate wall 104A of the base structure (102+104).

A stopper member 134 and an arm member 136 are secured to the second pivot shaft 130 to pivot therewith.

As is seen from FIG. 7, the stopper member 134 is formed at diametrically opposed portions of the second pivot shaft 130 with first and second stopper parts 134A and 134B. The first stopper part 134A is engageable with the second bent portion 114C of the latch condition detecting lever 114, while, the second stopper part 134B is engageable with an engaging part 102D which is raised from the side wall 102b of the base structure (102+104).

Figure 9:
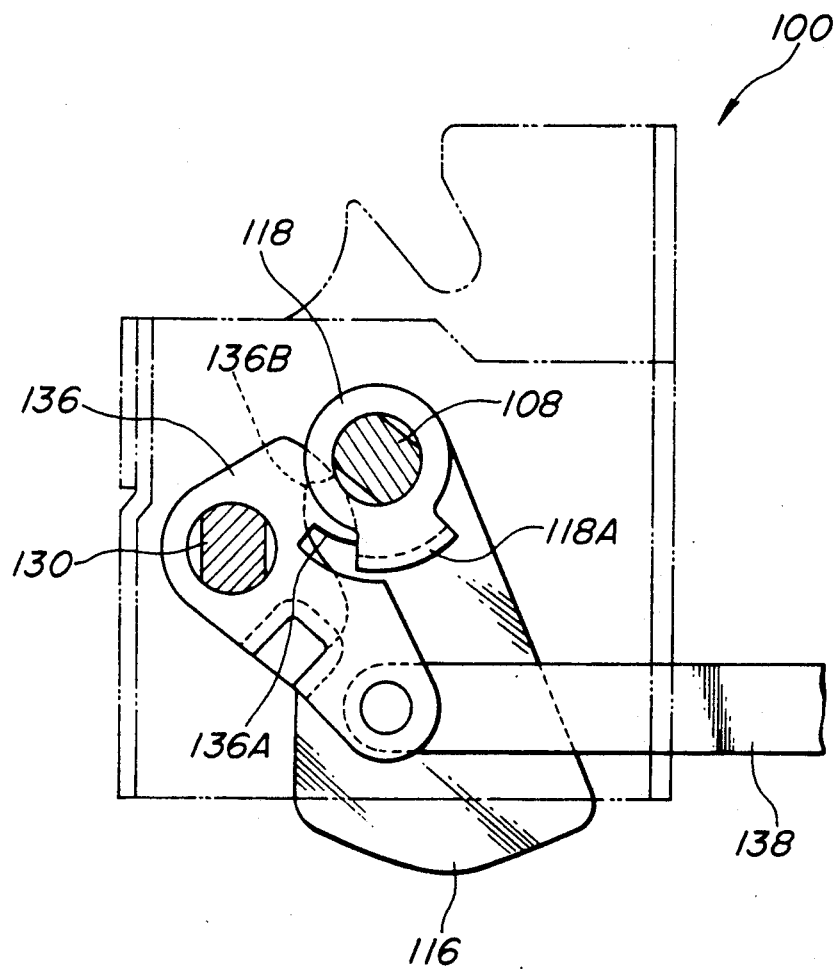
FIG. 9 is a sectional view taken along the line IX—IX of FIG. 5.

As is seen from FIG. 9, the arm member 136 has a leading end to which a connecting link 138 from the seat slide latching mechanism 200 is pivotally connected. The arm member 136 is formed at its middle portion with an arcutate recess 136A. Under an aftermentioned given condition, a pawl 118A of the pawl member 118 is inserted into the arcuate recess 136A to suppress the pivotal movement of the arm member 136. The arm member 136 further has an arcuate peripheral portion 136B (see FIG. 9) which is contactable with the pawl 118A.

Figure 6:
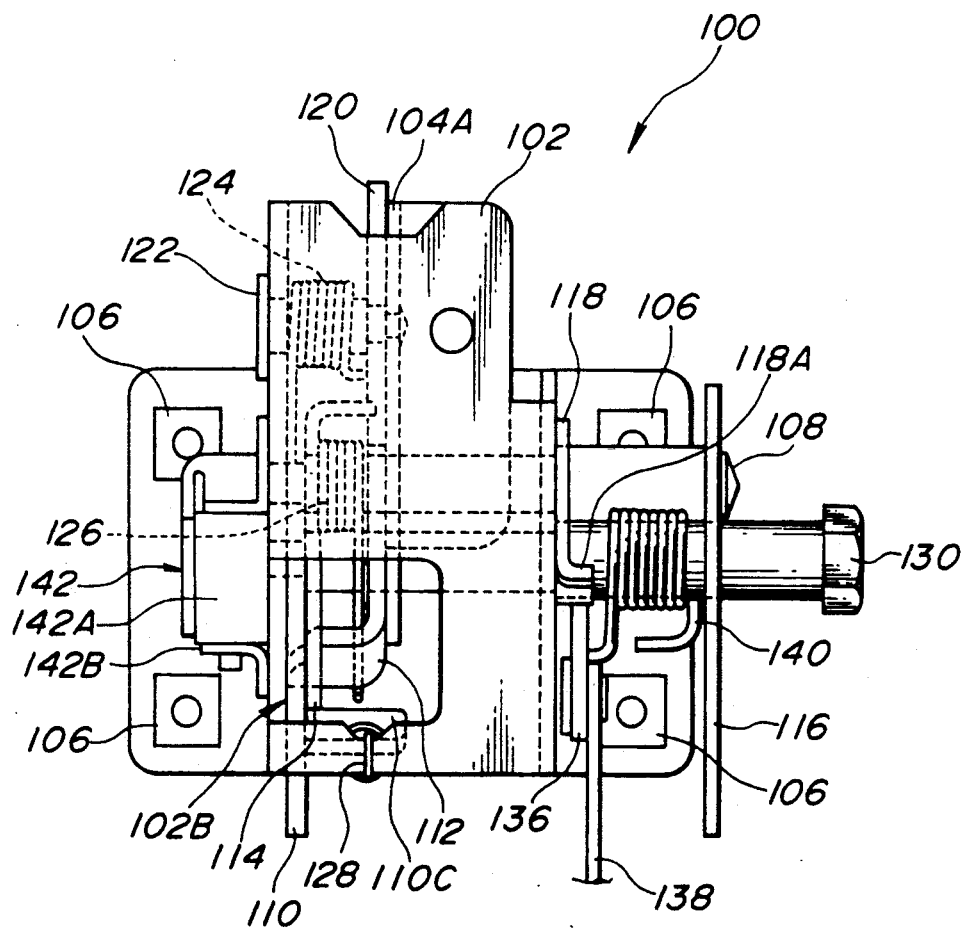
FIG. 6 back view of the seat cushion latching mechanism.
Figure 8:
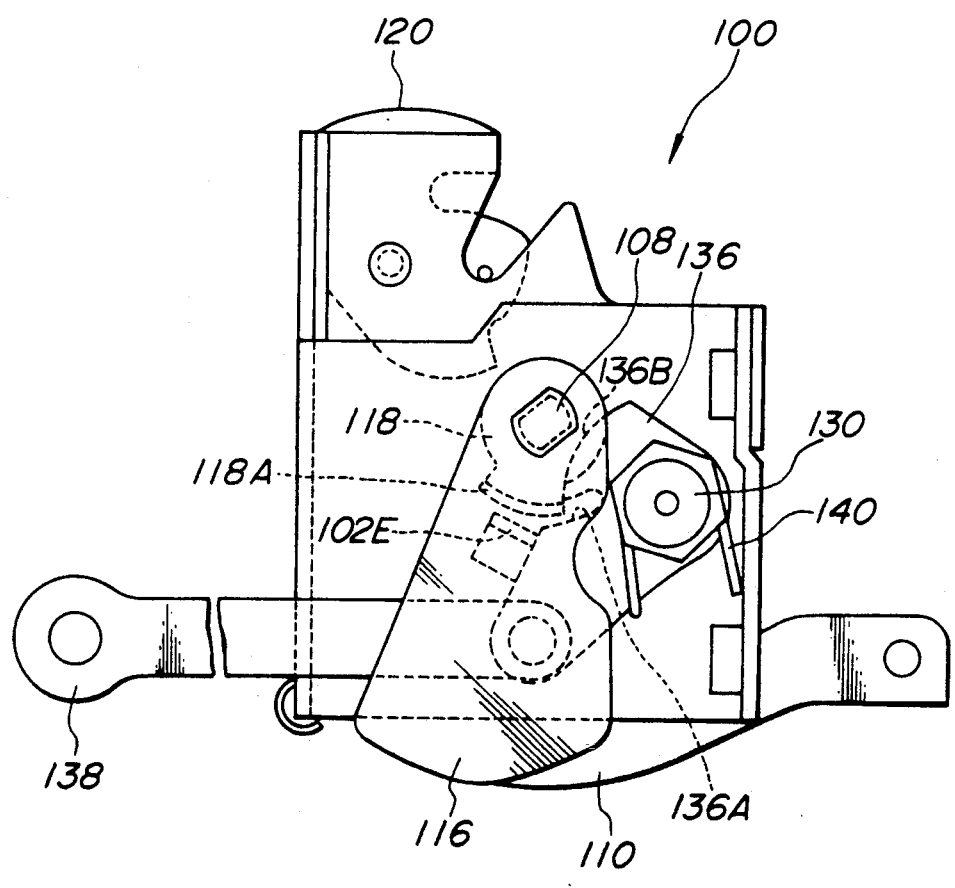
FIG. 8 is a right-side view of the seat cushion latching mechanism.

As is seen from FIGS. 5 and 6, a coil spring 140 is disposed about the second pivot shaft 130 to bias the arm member 136 and thus the second pivot shaft 130 in a counterclockwise direction in FIG. 7, that is, in a clockwise direction in FIG. 8.

As is seen from FIG. 8, with the biasing force of the spring 140, the arm member 136 is forced to contact with a stopper piece 102E pressed out of the side wall 102a of the base structure (102+104).

Designated by numeral 142 in FIGS. 5, 6 and 7, particularly in FIG. 7, is a damper device which is mounted to the side wall 102b of the base structure (102+104) near the recess 102B. The damper device 142 comprises an elastic member 142A which is exposed to the recess 102B and a case 142B which is secured to the side wall 102b to house the elastic member 142A. As is understood from FIG. 7, the damper device 142 damps a shock produced when the second striker 26 is led into the recess 102B.

As is seen from FIGS. 3 and 5, a second control handle 146 is secured to the second pivot shaft 130 to manually operate the same, which handle has a front portion exposed to the front of the front wall 16A of the supporting member 16.

As is seen from FIG. 3, the connecting link 138 extends toward the seat slide latching mechanism 200 to control the same.

That is, the connecting link 138 has a rear end pivotally connected to a cam plate 201 which is connected to a pivot shaft 202. The pivot shaft 202 is supported by the right and left supporting members 16 in a manner to rotate about its axis. The cam plate 201 has a cam edge which is in contact with the horizontal portion 30A of the latch member 30 through the elongate aperture 36A of the housing 36. Thus, upon rotation of the cam plate 201 in a given direction, the latch member 30 is pressed downward and thus the latched engagement between the upper and lower rails 14 and 12 becomes cancelled permitting free movement of the seat assembly 10 on and along the fixed lower rails 12.

The cam plate 116 fixed to the first pivot shaft 108 has a cam edge slidably engaged with the bent upper portion 42A of the actuating lever 42.

In the following, operation will be described.

For ease of understanding, the description will be commenced with respect to the condition of FIG. 1 wherein the seat assembly 10 assumes the rear latched position and the seat cushion 20 assumes the horizontal operative latched (or seat occupant holding) position.

Under this condition, the seat slide latching mechanism 200 assumes a condition wherein the latch member 30 (more specifically, the latch pawls 30C1) is latchingly engaged with the rear group of lock openings 12B and the seat cushion latching mechanism 100 assumes a so-called "first striker latching condition", as is depicted by FIG. 10. That is, the first striker 24 is received in the aligned recesses 102A and 104B of the base structure (102+104) and latchingly caught by the first latch member 120. Due to the biasing force of the coil spring 124, the stepped portion 120C of the first latch member 120 is forced to abut against the first leg portion 112A of the latching plate 112 thereby keeping the first latch member 120 at the latching position. Furthermore, due to the force of the spring 132, the latch condition detecting lever 114 is biased in a counterclockwise direction in FIG. 10 causing the second bent portion 114C thereof to engage with the first stopper part 134A of the stopper member 134. Accordingly, rotation of the second pivot shaft 130 and thus that of the arm member 136 in a clockwise direction in FIG. 10 due to manipulation of the second control handle 146 is suppressed. That is, movement of the connecting link 138 in a direction to operatively pivot the cam plate 201 is suppressed.

Thus, under this seat occupant holding condition of the seat cushion 20, the latched condition of the seat slide latching mechanism 200 can not be cancelled by the second control handle 146.

When the seat cushion 20 is desired to be in the upright position the first control handle 144 (viz., operation lever 110) is pulled upward in FIG. 10 by such a degree that the same is brought into contact with the raised stopper piece 102C (see FIG. 7). During this, the first pivot shaft 108 is rotated in the same direction because of the integral connection between the operation lever 110 and the first pivot shaft 108. Furthermore, during this, the latching plate 112 is rotated in the same direction together with the operation lever 110 because the bent portion 112C of the latching plate 112 is forced to abut against the operation lever 110, so that the first leg portion 112A of the latching plate 112 becomes disengaged from the stepped portion 120C of the first latch member 120. As a result, due to the force of the coil spring 124, the first latch member 120 is returned to its original or inoperative position releasing the first striker 24.

Thus, thereafter, the seat cushion 20 is permitted to pivot freely about the pivot shaft 18 (see FIGS. 1 and 2).

During the above-mentioned pivoting movement of the operation lever 110, the pawl member 118 secured to the first pivot shaft 108 is simultaneously rotated, so that the pawl 118A of the pawl member 118 becomes engaged with the recess 136A of the arm member 136 preventing the second control handle 146 from pivoting the arm member 136. Thus, during the operation of the operation lever 110, the latch cancelling operation of the seat slide latching mechanism 200 is inhibited.

When the seat cushion 20 thus released is folded up or pivoted in a clockwise direction in FIG. 1 by a certain degree, the second striker 26 is led into the recess 102B of the base structure (102+104) and collides with both the lower shoulder portion 110A of the operation lever 110 and the latch condition detecting lever 114 to rotate them in a clockwise direction in FIG. 10.

Finally, the movement of the second striker 26 induces a so-called "second striker latching condition" of FIG. 11 wherein the second striker 26 is caught by both the recess 110B of the operation lever 110 and the recess 114A of the detecting lever 114. It is to be noted that the collision of the second striker 26 against the levers 110 and 114 is damped by the damper device 142.

The seat cushion 20 thus assumes the foled-up and latched position as shown in FIG. 2.

As is understood from FIG. 11, under this condition, by the second striker 26, the latch condition detecting lever 114 is forced to assume its leftmost position against the force of the spring 132, so that the second bent portion 114C of the lever 114 is disengaged from the first stopper part 134A of the stopper member 134. Accordingly, under such condition, manipulation of the second control handle 146 for cancelling the latched condition of the seat slide latching mechanism 200 is permitted.

That is, when the second control handle 146 is pivoted upward rotating the second pivot shaft 130, the arm member 136 is rotated and thus the connecting link 138 is pulled (see FIG. 3) to pivot the cam plate 201 of the seat slide latching mechanism 200. Due to the pivoting of the cam plate 201, the latch member 30 is moved down against the force of the spring 32 releasing the latch pawls 30C1 of the latch member 30 from the lock openings 12B of the lower rail 12. Thus, the latched engagement of the upper rail 14 to the lower rail 12 becomes cancelled.

Accordingly, in this condition, the seat assembly 10 can move freely toward the front position with the seat cushion 20 kept foled up and latched. More specifically, the forward movement of the seat assembly 10 is permitted only when the seat cushion 20 takes the folded-up and latched position.

During the pivoting movement of the arm member 136 by the second control handle 146, the arcuate peripheral portion 136B of the arm member 136 is kept in engagement with the pawl 118A of the pawl member 118 preventing rotation of the first pivot shaft 108. Thus, latch cancelling operation of the seat cushion latching mechanism 100 by the first control handle 144 is inhibited.

During the forward movement of the seat assembly 10, the second control handle 146 is released from an operator's hand. Thus, during this movement, the latch pawls 30C1 of the latch member 30 are biased to slide on and along the lower surface of the upper side wall of the lower rail 12 due to the biasing force of the spring 32. When thus the seat assembly 10 comes to the front given position, the latch pawls 30C1 of the latch member 30 are forced to fall into the gront group of lock openings 12B establishing a latched engagement of the upper rail 14 with the lower rail 12 at the newly set front position.

The seat assembly 10 thus assumes the front latched position with the seat cushion 20 kept at the folded-up latched position, and thus, a larger luggage space is defined behind the seat assembly 10 in the vehicle cabin.

When the occupant holding condition of the seat assembly 10 is needed again, the second control handle 146 is manipulated to unlatch the upper rail 14 from the lower rail 12 and the seat assembly 10 is moved to the given rear position. For the reason as is mentioned hereinabove, upon arrival of the seat assembly 10 at the rear given position, a latched engagement between the upper and lower rails 14 and 12 is established as is understood from FIG. 2.

Then, for cancellation of the latched condition of the folded-up seat cushion 20, the first control handle 144 (viz., operation lever 110) is pulled upward by such a degree that the operation lever 110 becomes in contact with the stopper piece 102C of the side wall 102b of the base structure (102+104). With this operation, the striker catching recess 110B of the operation lever 110 releases the second striker 26. Thus, thereafter, the seat cushion 20 is permitted to pivot donwward freely about the pivot pin 18.

During the pivoting movement of the operation lever 110, the pawl 118A of the pawl member 118 is in engagement with the arcuate recess 136A of the arm member 136 and thus the latch cancelling operation of the seat slide latching mechanism 200 by the second control handle 146 is inhibited.

In fact, one of the seat cushion latching mechanism 100 and the seat slide latching mechanism 200 is being manipulated for cancelling the latched condition, the other mechanism is prevented from cancelling the latched condition.

It is to be noted that, as is seen from FIGS. 3 and 10, the upward pivoting of the first control handle 144 causes a clockwise pivoting of the cam plate 116 pressing the bent upper portion 42A of the actuating lever 42 of the restraining mechanism 40 downward. Since, in this state, the actuating lever 42 is placed just above the locking opening 12C of the lower rail 12, the lower end of the actuating lever 42 is inserted into the locking opening 12C thereby establishing a latched engagement between the lower and upper rails 12 and 14.

That is to say, during manipulation of the first control handle 144 for cancelling the latched condition of the seat cushion 20, the latched engagement of the seat assembly 20 to the fixed lower rail 12 is independently provided by both the seat slide latching mechanism 200 and the restraining mechanism 40.

When the seat cushion 20 thus released is pressed downward, the first striker 24 is led into the aligned recesses 102A and 104B of the base structure (102+104) and collides against the lower peripheral side 120A of the first latch member 120 to rotate the member 120 in a counterclockwise direction in FIG. 7 against the force of the coil spring 124. The insertion of the first striker 24 into the aligned recesses 102A and 104B induces finally the "first striker latching condition" of FIG. 10 which has been described in detail hereinafore. Thus, the seat occupant holding condition as shown in FIG. 1 is established.

Figure 12:
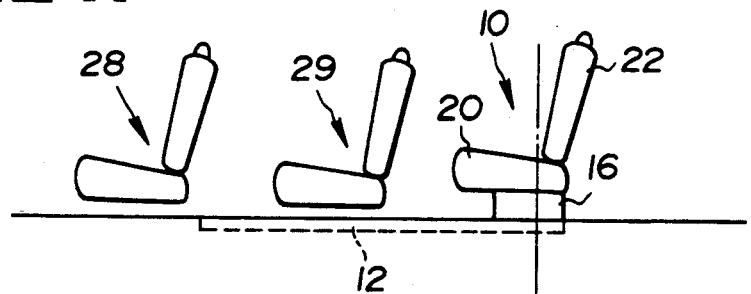
FIG. 12 is an illustration showing various conditions of the seat assembly of the present invnetion.
Figure 12:
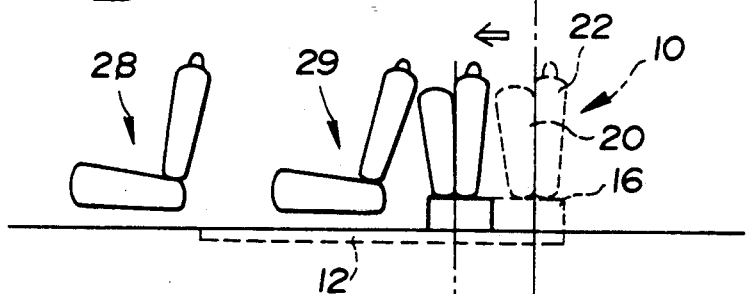
Figure 12:
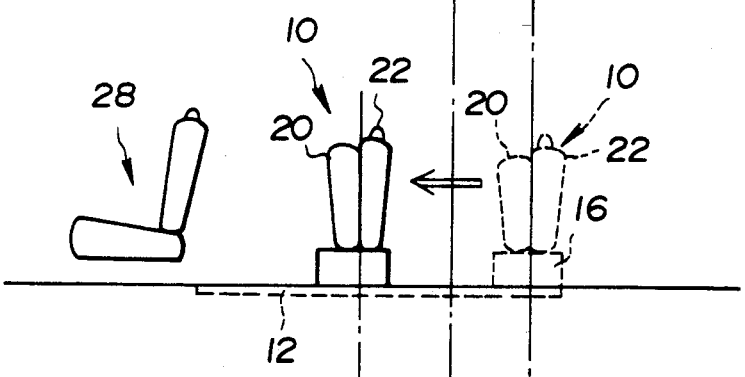
Figure 12:
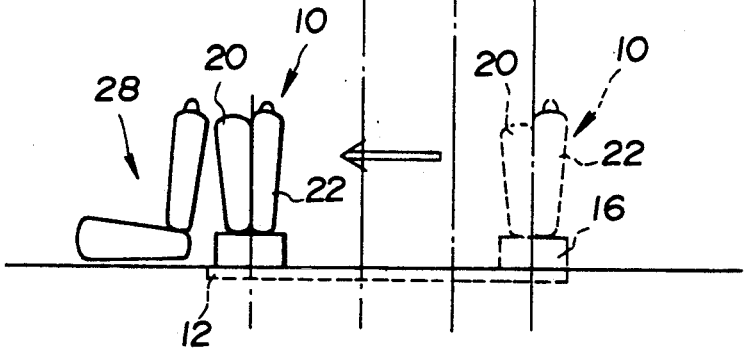

Referring to FIG. 12, there are shown four exemplified layouts "A", "B", "C" and "D" of seats in a van-type motor which uses the seat assembly 10 of the present invention as a rear seat. Designated by numerals 28 and 29 are front and intermediate seats respectively. The intermediate seat 29 is of a detachable type.

In the layout "A", the front and intermediate seats 28 and 29 assume their given positions and the rear seat 10 assumes its rearmost latched position "I" having the seat cushion 20 kept in the horizontal and latched condition. In the layout "B", the front and intermediate seats 28 and 29 assume the given positions and the rear seat 10 assumes a position "II" just behind the intermediate seat 29 having the seat cushion 20 thereof kept in the folded-up latched condition. In the layout "C", the intermediate seat 29 is removed and the rear seat 10 assumes an intermediate latched position "III" having the seat cushion 20 kept in the folded-up latched condition. In the layout "D", the intermediate seat 29 is removed and the rear seat 10 assumes its frontmost position "IV" just behind the front seat 28 having the seat cushion 20 kept in the folded-up latched condition.

In order to provide these four layouts in the vehicle cabin, first, second, third and fourth groups of lock openinings 12B are formed in the lower rail 12.

In the layouts "A" and "C", the rear seat 10 can pivot the seat cushion 20 to the horizontal operative position. For this, the lock openings 12B for the restraining mechanism 40 are provided at the positions "I" and "III".

In the following, advantages of the present invention will be described.

First, because of provision of the restraining mechanism 40, the unexpected sliding of the seat assembly 10 during manipulation of the seat cushion latching mechanism 100 (more specifically, the first control handle 144) is assuredly prevented. In other words, during the manipulation of the first control handle 144, the latched engagement between the lower and upper rails 12 and 14 is achieved by not only the seat slide latching mechanism 200 but also the restraining mechanism 40.

Second, the restraining mechanism 40 can serve as a seat position sensor which senses proper given positions, such as, the positions "I" and "III" shown in FIG. 12. That is, only when the seat assembly 10 assumes the positions "I" and "III", operative manipulation of the first control handle 144 for cancelling the latched condition of the seat cushion 20 is permitted. This means that the horizontal operative position of the seat cushion 20 is permitted only when the seat assembly 10 assumes the given positions "I" and "III" wherein the seat assembly 10 is latched to the fixed lower rail 12.

What is claimed is:

1. A seat assembly for a motor vehicle, comprising:
   a lower rail having a first lock opening and being secured to a floor of the vehicle;
   an upper rail slidably engaged with said lower rail;
   a base structure secured to said upper rail to move therewith;
   a seat cushion pivotally connected to said base structure such that said seat cushion can move between a horizontal operative position and an upright inoperative position relative to said base structure;
   a seat slide latching mechanism for selectively latching and unlatching said upper rail relative to said lower rail;
   a seat cushion latching mechanism for selectively latching and unlatching said seat cushion at said horizontal operative and upright inoperative positions relative to said base structure; and
   a restraining mechanism, responsive to said seat cushion latching mechanism, for latching said upper rail to said lower rail when said seat cushion latching mechanism operates to unlatch said seat cushion relative to said base structure, the latching accomplished by said restraining mechanism being independent from the latching accomplished by said seat slide latching mechanism;
   wherein said restraining mechanism comprises
   said first lock opening in said lower rail;
   an actuating lever having an upper portion being movable vertically and being carried by said upper rail, and having a lower portion which faces said first lock opening when said upper rail assumes a predetermined position relative to said lower rail;
   biasing means for biasing said actuating lever in a direction away from said first locking opening; and
   a cam member being actuated by said seat cushion latching mechanism and being engageable with said actuating lever,
   whereby when, with said upper rail in said predetermined position, said cam member is actuated by said seat cushion latching mechanism to move in a given direction, said cam member engages and presses down said actuating lever against the force of said biasing means thereby inserting said lower portion of said actuating lever into said first locking opening.

2. A seat assembly as claimed in claim 1, in which said upper portion of said actuating lever is bent and has a convex outer surface.

3. A seat assembly as claimed in claim 2, in which said restraining mechanism further comprises:
   a bracket secured to said upper rail, said bracket having an elongate slot through which said actuating lever slidably passes in a manner to achieve a guided movement thereof relative to said bracket and a vertically extending guide slot; and
   a guide pin secured to said actuating lever and slidably received in said guide slot of said bracket.

4. A seat assembly as claimed in claim 3, in which said biasing means is a coil spring which is disposed about said actuating lever.

5. A seat assembly as claimed in claim 4, wherein said lower rail has a second lock opening therein and said seat slide latching mechanism comprises:
   said second lock opening in said lower rail;
   a latch member movably held by said upper rail, said latch member having a latch pawl which is latchingly engageable with said second lock opening;
   a control handle connected to said seat cushion latching mechanism; and
   a link mechanism extending between said latch member and said control handle such that when said control handle is moved in a specific direction, said latch member is moved against the force of said latch member biasing means in a direction to cancel a latched engagement between said latch pawl and said second lock opening.

6. A seat assembly as claimed in claim 5, in which said seat cushion latching mechanism comprises:
   first and second strikers secured to spaced portions of said seat cushion;
   a first latching means for latching said first striker when said seat cushion is in said horizontal operative position;
   a second latching means for latching said second striker when said seat cushion is in said upright inoperative position; and
   an operation lever pivotally supported by said base structure and cooperating with said first and second latching means such that a pivotal movement of the operation lever in one direction cancels a latched condition of said seat cushion.

* * * * *